United States Patent
Wendling et al.

(10) Patent No.: US 9,197,312 B2
(45) Date of Patent: Nov. 24, 2015

(54) NEAR FIELD COMMUNICATION SYSTEM IN A LOCAL NETWORK

(71) Applicant: NAGRAVISION S.A., Cheseaux-sur-Lausanne (CH)

(72) Inventors: Bertrand Wendling, Divonne-les-Bains (FR); Henri Kudelski, Chexbres (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 74 days.

(21) Appl. No.: 14/202,779

(22) Filed: Mar. 10, 2014

(65) Prior Publication Data

US 2014/0254470 A1    Sep. 11, 2014

Related U.S. Application Data

(60) Provisional application No. 61/775,737, filed on Mar. 11, 2013.

(51) Int. Cl.
*H04B 7/15* (2006.01)
*H04W 4/00* (2009.01)
(Continued)

(52) U.S. Cl.
CPC .. *H04B 7/15* (2013.01); *G06F 9/54* (2013.01); *G06Q 20/3278* (2013.01); *G06Q 20/385* (2013.01); *G06Q 20/425* (2013.01); *G06Q 30/0637* (2013.01); *H04B 5/0031* (2013.01); *H04L 41/50* (2013.01); *H04L 47/70* (2013.01); *H04L 69/08* (2013.01); *H04N 5/4403* (2013.01); *H04N 21/2223* (2013.01); *H04N 21/2543* (2013.01); *H04N 21/4126* (2013.01); *H04N 21/4185* (2013.01); *H04N 21/41407* (2013.01); *H04N 21/4221* (2013.01); *H04N 21/4222* (2013.01); *H04N 21/42221* (2013.01); *H04N 21/42222* (2013.01); *H04N 21/4367* (2013.01); *H04N 21/43637* (2013.01);
(Continued)

(58) Field of Classification Search
CPC ....... H04B 7/15; H04B 5/0031; H04W 76/02; H04W 88/16; H04W 80/00; H04W 4/008; G06Q 20/3278; G06Q 20/425; G06Q 30/0637; G06Q 20/385; H04L 47/70; H04L 41/50; H04L 69/08; H04N 21/2545; H04N 21/42221; H04N 21/2223; H04N 21/41407; H04N 21/4221; H04N 21/43637; H04N 21/4627; H04N 21/485; H04N 21/8355; H04N 2005/4414; H04N 2005/4428; H04N 21/4222
USPC ........................... 370/315; 455/41.1; 709/225
See application file for complete search history.

(56) References Cited

U.S. PATENT DOCUMENTS 7,128,274 B2   10/2006 Kelley et al.
7,147,157 B2 * 12/2006 Proennecke ................. 235/451
(Continued)

FOREIGN PATENT DOCUMENTS

EP      2 221 748      8/2010
WO    WO 99/57901    11/1999

OTHER PUBLICATIONS

European Search Report issued in EP 14158749.3 dated Jul. 8, 2014.

*Primary Examiner* — Afsar M Qureshi
(74) *Attorney, Agent, or Firm* — DLA Piper LLP US

(57) ABSTRACT

A system for a local network, the system being configured to extend a near field communication (NFC) between an NFC device and an NFC mobile device beyond the range defined by the NFC standards.

15 Claims, 2 Drawing Sheets

(51) Int. Cl.
*H04W 76/02* (2009.01)
*H04B 5/00* (2006.01)
*G06Q 20/32* (2012.01)
*G06Q 30/06* (2012.01)
*H04L 12/911* (2013.01)
*H04L 12/24* (2006.01)
*H04N 21/2543* (2011.01)
*H04N 21/422* (2011.01)
*H04N 21/478* (2011.01)
*G06F 9/54* (2006.01)
*G06Q 20/38* (2012.01)
*G06Q 20/42* (2012.01)
*H04N 5/44* (2011.01)
*H04N 21/222* (2011.01)
*H04N 21/41* (2011.01)
*H04N 21/414* (2011.01)
*H04N 21/4185* (2011.01)
*H04N 21/4363* (2011.01)
*H04N 21/4367* (2011.01)
*H04N 21/4627* (2011.01)
*H04N 21/4784* (2011.01)
*H04N 21/485* (2011.01)
*H04N 21/6334* (2011.01)
*H04N 21/8355* (2011.01)
*H04W 80/00* (2009.01)
*H04W 88/16* (2009.01)
*H04L 29/06* (2006.01)

(52) U.S. Cl.
CPC ...... *H04N 21/4627* (2013.01); *H04N 21/4784* (2013.01); *H04N 21/47815* (2013.01); *H04N 21/485* (2013.01); *H04N 21/6334* (2013.01); *H04N 21/8355* (2013.01); *H04W 4/008* (2013.01); *H04W 76/02* (2013.01); *H04W 80/00* (2013.01); *H04W 88/16* (2013.01); *H04N 2005/4414* (2013.01); *H04N 2005/4426* (2013.01); *H04N 2005/4428* (2013.01)

(56) References Cited

U.S. PATENT DOCUMENTS

| | | | |
|---|---|---|---|
| 8,233,937 B2 * | 7/2012 | Ueda et al. | 455/552.1 |
| 2003/0095524 A1 | 5/2003 | Stephens et al. | |
| 2005/0097618 A1 * | 5/2005 | Arling et al. | 725/114 |
| 2007/0115819 A1 | 5/2007 | Stephens et al. | |
| 2010/0183025 A1 | 7/2010 | Stephens et al. | |
| 2010/0264211 A1 * | 10/2010 | Jain et al. | 235/380 |
| 2012/0100803 A1 * | 4/2012 | Suumaki et al. | 455/41.1 |
| 2012/0155349 A1 | 6/2012 | Bajic et al. | |
| 2012/0220282 A1 * | 8/2012 | Kwon et al. | 455/418 |
| 2013/0005250 A1 * | 1/2013 | Kim et al. | 455/41.1 |
| 2013/0137374 A1 | 5/2013 | Stephens et al. | |
| 2014/0279479 A1 * | 9/2014 | Maniar et al. | 705/41 |

* cited by examiner

NEAR FIELD COMMUNICATION SYSTEM IN A LOCAL NETWORK

CROSS-REFERENCE TO RELATED APPLICATIONS

This application claims the benefit of U.S. Provisional Application No. 61/775,737, file Mar. 11, 2013, which is incorporated by reference in its entirety.

FIELD OF THE INVENTION

Embodiment disclosed herein relate to systems using near field communication (NFC) technology for digital devices connected to a local network.

BACKGROUND

Near Field Communication Technology, known by the acronym "NFC", is a wireless, high frequency communication technology having a range of a few centimeters intended to exchange information between several peripherals. This technology results from a combination of a contactless chip card interface and a reader in a single device. An NFC peripheral can communicate with other NFC peripherals as well as with other devices meeting ISO 14443 standards such as e.g., contactless chip cards.

The NFC standards covering communication protocols and data exchange formats are based on existing radio frequency identification standards (RFID) such as ISO/IEC 14443, FeliCa and ISO/IEC 18092. They include the standards defined by the "NFC Forum" founded in 2004 by Nokia, Philips and Sony comprising today more than 180 members.

NFC technology is an extension of RFID technology, allowing bidirectional communications between two peripherals, while previous systems, such as contactless chip cards, allowed only unidirectional communication.

NFC technology is usable only over a short distance of about a few centimeters, which implies a voluntary process from the user by preventing a usage without his knowledge.

NFC devices may be passive or active. A passive device such as a tag, chip card or a single chip integrated in an object contains information accessible in a read only mode by other NFC compatible devices. The passive device is powered by the electromagnetic field emitted by the reader (active device) so that it does not need its own power supply. On the other hand, an active device generates the electromagnetic field for communicating with a passive device or for establishing a communication channel between two active devices.

The fact that a device like a smartphone has a power supply does not necessarily mean that it will work in active mode only. A smartphone, or any other portable device like a PDA (Personal Digital Assistant) or a digital tablet, may process its NFC interface in a passive or active mode. In a passive mode, the smartphone emulates a chip card and stores, in a secure memory, the information usually stored in the chip card. Thus, when the smartphone detects the electromagnetic field, it will access the secure memory and answer in a passive NFC mode with the information read from this secure memory.

The following are examples of known applications that use NFC technology:
- Payment using a contactless bank card or a mobile device (e.g., smartphone, portable computer, digital tablet, PDA, etc.) on a contactless payment terminal;
- Parking payment on a terminal accepting contactless payment carried out with a portable phone;
- Buying and contactlessly validating a ticket for transportation or a show with the smartphone or other mobile device;
- Managing discount vouchers in a shop, couponing by traders, etc;
- Accessing and starting a vehicle with a portable phone or other mobile device;
- Reading product information (e.g., price, composition, usage, etc.) in a shop;
- Controlling physical access to reserved places (e.g., meeting rooms, company, class rooms, etc.)
- Exchanging profiles between two users of a social network or game by bringing phones close together (e.g., user peer-to-peer communications);
- Reading electronic business cards with a mobile terminal or PDA;
- Synchronizing Internet bookmarks and contacts between a PDA and a portable phone;
- Retrieving a key or code to a WiFi access point by approaching an NFC mobile terminal to the emitting hotspot; and
- Accessing different automation functionalities of a building (e.g., home automation)

NFC systems are designed to enable communication between devices that are positioned close to each other. However, sometimes this may be cumbersome within e.g., a home or a home network in which users wish to access additional functions offered through an NFC link, even if the distance between the devices is greater than the usual NFC communication distance.

SUMMARY

An object of the embodiments disclosed herein is to extend NFC communications between an NFC device and an NFC mobile device beyond the range defined by the NFC standards.

This object is achieved by a system comprising:

at least two repeater devices, each repeater device comprising a first communication interface configured to exchange information within a local communication network and a second communication interface locally connected to the first communication interface, the second communication interface comprising an NFC transceiver configured to exchange digital data intended to be transferred to the local communication network via the first communication interface;

a stand alone device associated with a first repeater device, the stand alone device comprising an NFC communication interface coupled with the NFC transceiver of said first repeater device; and a mobile device comprising an NFC communication interface configured to exchange digital data with an NFC transceiver of a second repeater device, said second repeater device being configured to forward, to the local communication network, the digital data received from the mobile device via the NFC communication interface, said digital data being transmitted to the stand alone device via the first repeater device, said first repeater device being at a distance from the second repeater device exceeding a standard range for NFC communications.

The data read by the second repeater device through the NFC communication interface of the mobile device is thus transferred to the stand alone device due to the local communication network to which the first repeater device is connected to.

The stand alone device may thus be located a long distance away from the NFC featured mobile device and still receive data in a manner similar to the manner offered by direct NFC communications (i.e., as if the mobile device was located only a very small distance away from the stand alone device).

This solution uses bi-directional NFC repeater devices connected to the local communication network, each being provided with NFC communication capabilities. For example, a home or a household is equipped with several repeater devices; each repeater device comprises a mechanism for communicating with at least one other repeater device, such that all of the repeater devices of the home network are connected together. The communication can be made through several means such as e.g., WiFi, Internet, radio frequency, power lines (PLC Power Line Carrier) or any other technology with a longer communication range than the NFC standard range.

Each repeater device comprises NFC capabilities such that the digital data comprising commands or instructions from an NFC mobile device can be read by at least one repeater device if the NFC mobile device is placed close to the repeater device. The repeater device receiving command data from an NFC mobile device forwards said command data to any other repeater device of the home network through the home network. Thus, a single NFC mobile device can be used to communicate with other devices (e.g., stand alone devices) of the home network even if the NFC mobile device is located a distance away from the stand alone devices.

BRIEF DESCRIPTION OF THE DRAWINGS

The embodiments disclosed herein and their advantages will be better understood with reference to the enclosed drawings and the following detailed description, in which.

DETAILED DESCRIPTION

Figure 1:
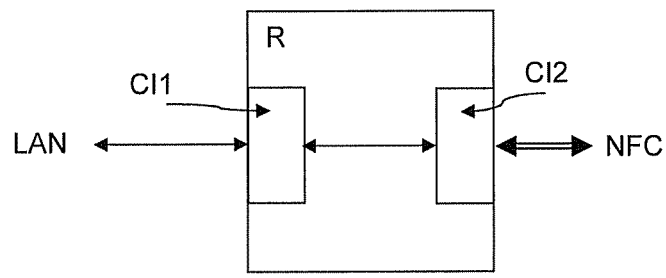
FIG. 1 shows a block diagram of a repeater device comprising a LAN and NFC communication interfaces

A repeater device R is schematically illustrated in FIG. 1 as comprising a first communication interface CI1 able to exchange data with a local network LAN and a second communication interface CI2 able to communicate with an NFC device via an NFC transceiver. The first and the second communication interfaces are locally connected together so that data received from the second communication interface CI2 or NFC interface are transferred to the first communication interface CI1 or LAN interface and vice-versa. In addition, the LAN interface may transmit data coming from the local network back to the NFC interface.

Figure 2:
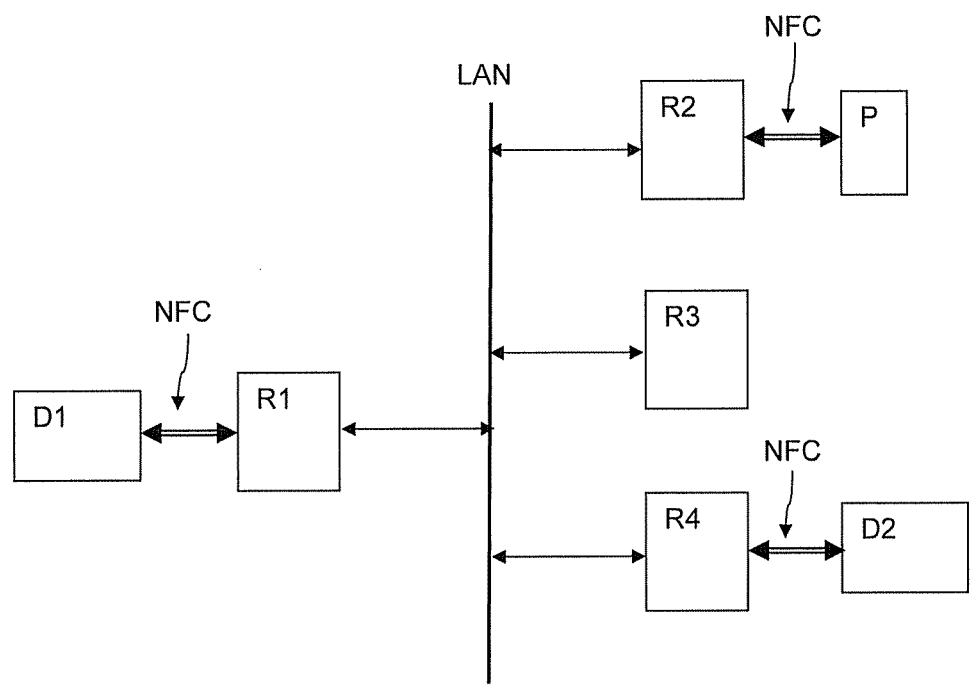
FIG. 2 shows a block diagram of a system according to a disclosed embodiment comprising a plurality of repeater devices connected to a local network allowing the transfer of data from an NFC mobile device to a distant device via repeater devices placed respectively close to the mobile device and to the distant device.

According to a desired configuration, repeater devices R1, R2, R3, R4 are connected to each other in a bidirectional local network LAN via their first communication interface CI1 as illustrated by FIG. 2. The system of the invention comprises a set of repeater devices each associated with a stand alone device and a set of repeater devices configured to communicate with a mobile NFC device. In the example of FIG. 2, the system comprises repeater devices R1, R2, R3, R4, ... whose second communication interface CI2 or NFC interface may be linked either to at least one NFC mobile device P or at least one stand alone device D1, D2 having NFC capabilities.

The local network LAN is preferably wireless using a standardized radio frequency connection such as defined in Wi-Fi standard, but it may also be wired using a standard cable connection such as e.g., Ethernet links, or hybrid using a combination of wireless and wired connections.

The mobile NFC device P may comprise a smart card of a passive or active type, smartphone, PDA, tablet, remote control or any other potable or hand held device adapted to transmit data to a repeater device R1, R2, R3, R4, ... of the LAN network.

An active smartcard as described in e.g., U.S. Pat. No. 7,128,274 is provided with an internal power source that generates an electromagnetic field for communicating with the repeater device R1, R2, R3, R4, ....

A passive smart card acts as an RFID device powered by an electromagnetic field generated by the repeater device. The other mobile NFC devices (e.g., smartphone, tablet, PDA, etc.) may be set to either the passive or active mode.

The stand alone devices D1, D2 may comprise a fixed appliance provided with an NFC communication interface placed near a repeater device R1, R2, R3, R4, ... at a distance within the NFC range (e.g., up to 10 cm). A connection between the stand alone device D1, D2 and the LAN network communication interface is thus facilitated since communication is possible via the repeater device. For example, in a home network, devices such as a television set, decoder or set top box, DVD and/or HD (hard disc) reader/writer, media player, personal computer, security alarm, heat controller, air conditioner, etc. may be activated/deactivated or controlled with via an NFC connection with a repeater device R1, R2, R3, R4, ....

In the system represented by FIG. 2, a portable NFC device P sends, via the NFC link of repeater device R2, digital data in form of a command addressed to stand alone device D1 associated with repeater device R1 and/or to stand alone device D2 associated with the repeater device R4.

The following transmission modes may be used to forward the command:

a) Broadcast mode: all repeater devices R2, R3, R4 receive the same command without a specific identifier of a repeater device or of a stand alone device D1, D2. In this case, the NFC transceiver of the repeater device sends an interrogation signal to test a presence of a stand alone device within the NFC range. If such a device is present, its NFC communication interface replies to the interrogation signal with a response signal informing the repeater device that the stand alone device is ready to receive the command. The broadcasting mode thus allows activating several stand alone devices D1, D2 at a same time, with a portable NFC device P, if they are placed near a repeater device R1, R4 of the LAN network and their NFC interface is powered on.

The broadcast mode allows using an NFC featured smart card in a passive mode, which may be read by any repeater device in the network to automatically send a command to one or more other repeater devices R1, R4, and to their associated stand alone devices D1, D2.

b) Push mode: a command is addressed to a specific stand alone device while the other stand alone devices ignore the command even if they are placed within the NFC range and have an NFC interface powered on. In this case, the command comprises a device identifier and/or an identifier of the repeater device to which a stand alone device is associated with. After checking the identifier of the command, the NFC transceiver of the repeater device forwards the command to the stand alone device only when a match is found with the identifier of the repeater device or the identifier of the stand alone device.

The push mode requires a user interface on the mobile NFC device allowing the selection of a specific stand alone device to be controlled with a command. For example, in a system setup phase all repeater devices and associated stand alone devices may be registered with their particular parameters in an application. A user can thus create and address specific commands to a specific stand alone device. The NFC interface of the mobile device is preferably used in active mode.

According to an embodiment, the application on the mobile device may also be allowed to create predefined groups of stand alone devices to which a same command can be addressed.

c) Pull mode: the mobile NFC device P interrogates a repeater device to detect active stand alone devices associated with the other repeater devices of the network. Once one or more active devices are detected, commands may be sent to these devices either in broadcast mode or, individually, in push mode. In this case, a first repeater device of the network is requested by the mobile device to explore the network and discover each active repeater device, which are requested in their respective turn to send an interrogation signal to an associated stand alone device, if any. The responses of the stand alone devices received by the repeater devices are forwarded to the network and read by the mobile NFC device in contact with the first repeater device. An application of the mobile device identifies each discovered stand alone device and creates a list allowing the selecting and activating, deactivating or controlling of a stand alone device by a specific command addressed to one device or a common command addressed to all or a group of devices.

According to a further embodiment, the mobile NFC device P may be provided with an application allowing it to send commands to the stand alone devices either in broadcast, push, or pull mode, or a combination of these modes, depending on a mode selection made on the user interface.

Figure 3:
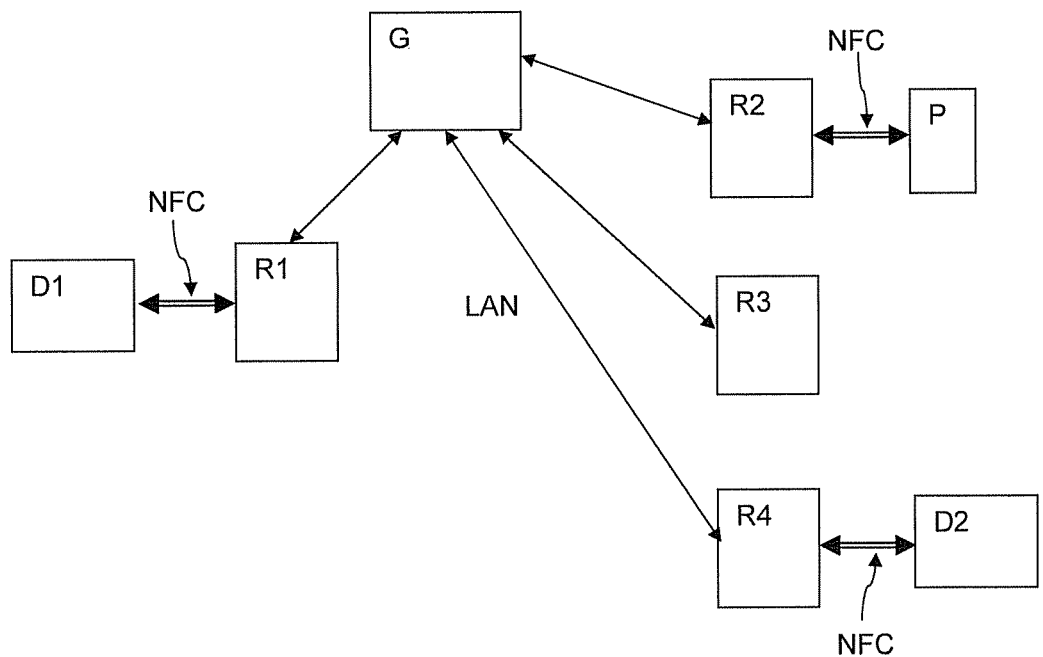
FIG. 3 shows a block diagram of an embodiment of the system disclosed herein comprising a gateway configured to forward information from one repeater device to another.

According to a further embodiment illustrated in FIG. 3, each repeater device R1, R2, R3, R4 may be connected to a gateway G server in charge of managing the bidirectional communications between the repeater devices of e.g., a local network LAN. The connection between the repeater devices and the gateway G may be wireless, wired or mixed as in the network configuration of FIG. 2. The above discussed transmission modes are also operable in this embodiment since they do not depend on the configuration of the local network.

According to a further embodiment, an acknowledgement message may be returned to the mobile NFC device when the command has been received and/or executed successfully by one or more stand alone devices associated with their respective repeater device.

As the NFC communication technology has a short range of up to 10 cm, the repeater device and the mobile NFC device or the stand alone device must be close to one another so that encryption of the transmission is in general not necessary. However, for high security purposes, the transmission may be encrypted using a pairing mechanism between the concerned devices. The pairing may be applied as described for example in the European document EP1078524B1. The command transmitted from the repeater device to the stand alone device is encrypted by a unique pairing key known by the repeater device and the stand alone device. The latter verifies the pairing with the repeater device preferably at each reception of a command. If the pairing verification is successful, the command is executed by the stand alone device. An advantage of this pairing feature is that it prevents associating an unauthorized stand alone device to a repeater device.

A similar pairing mechanism may also be applied between the mobile NFC device and each repeater device of the network. In this case, the mobile NFC device stores all of the necessary pairing keys in order to be able to communicate with any repeater device of the local LAN network. An advantage of this pairing feature is that it prevents communications between a repeater device and an unauthorized mobile device.

In order to save power, an NFC communication between a repeater device R1, R4 and an associated stand alone device D1, D2, as well as the communication between the mobile NFC device and a repeater device, is deactivated after successful transmission of the command. In the case of an unsuccessful transmission, the NFC communication is deactivated after a predetermined time.

It should be appreciated that a stand alone device can also receive a command directly from the NFC mobile device when it is placed close to the NFC interface.

The invention claimed is:

1. A system comprising:
   at least two repeater devices, each repeater device comprising a first communication interface configured to exchange information within a local communication network and a second communication interface locally connected to the first communication interface, the second communication interface comprising a near field communication (NFC) transceiver configured to exchange digital data intended to be transferred to the local communication network via the first communication interface;
   a stand alone device associated with a first repeater device, the stand alone device comprising an NFC communication interface coupled with the NFC transceiver of said first repeater device; and
   a mobile NFC device comprising an NFC communication interface configured to exchange digital data with an NFC transceiver of a second repeater device, said second repeater device being configured to forward, to the local communication network, the digital data received from the mobile device via the NFC communication interface, said digital data being transmitted to the stand alone device via the first repeater device, said first repeater device being at a distance from the second repeater device exceeding a standard range for NFC communications.

2. The system according to claim 1, wherein the local network uses wireless, wired or a combination of wireless and wired connections.

3. The system according to claim 1, wherein the mobile NFC device includes an active or passive smart card.

4. The system according to claim 1, wherein the mobile NFC device is one of a smartphone, portable tablet, or a personal digital assistant.

5. The system according to claim 1, wherein the stand alone device comprises a fixed appliance having an NFC communication interface placed near the NFC transceiver of a repeater device at a distance within the standard range for NFC communications.

6. The system according to claim 1, further comprising a set of repeaters devices, each associated with a stand alone device, and a set of repeater devices configured to exchange digital data with the mobile NFC device.

7. The system according to claim 6, wherein the mobile NFC device is configured to send, in a broadcast mode, digital data to all stand alone devices associated with a repeater device of the local network.

8. The system according to claim 6, wherein the mobile NFC device is configured to send, in a push mode, a command addressed to one specific stand alone device or to a group of stand alone devices via their respective repeater devices.

9. The system according to claim 6, wherein the mobile NFC device is configured to send, in a pull mode, a command addressed to one specific stand alone device or to a group of stand alone devices via their respective repeater devices, the mobile device exploring the local network to detect repeater devices associated with active stand alone devices before sending the command.

10. The system according to claim 1, wherein each repeater device is connected to a gateway server that manages bidirectional communications between the repeater devices, the connection between the repeater devices and the gateway being wireless, wired or a combination of wireless and wired connections.

11. The system according to claim 6, wherein an acknowledgement message is returned to the mobile NFC device when a command has been received and/or executed successfully by one or more stand alone devices associated with their respective repeater device.

12. The system according to claim 1, wherein data transmitted between a repeater device and a stand alone device is encrypted by a unique pairing key known by the repeater device and the stand alone device.

13. The system according to claim 1, wherein a pairing mechanism is applied between the mobile NFC device and each repeater device of the network, the mobile NFC device storing all the necessary pairing keys in order to be able to communicate with any repeater device of the local network.

14. The system according to claim 1, wherein an NFC communication between a repeater device and an associated stand alone device, as well as the communication between the mobile NFC device and a repeater device, is deactivated after successful transmission of a command.

15. The system according to claim 1, wherein an NFC communication between a repeater device and an associated stand alone device, as well as the communication between the mobile NFC device and a repeater device, is deactivated after a predetermined time after an unsuccessful transmission of a command.

\* \* \* \* \*